US011766031B2

(12) United States Patent
Ihde et al.

(10) Patent No.: US 11,766,031 B2
(45) Date of Patent: Sep. 26, 2023

(54) SYSTEM AND METHOD FOR PROMOTING ATTACHMENT AND GROWTH OF BIVALVE ORGANISMS ON COASTAL STRUCTURES

(71) Applicant: Morgan State University, Baltimore, MD (US)

(72) Inventors: Thomas F. Ihde, St. Leonard, MD (US); Richard V. Lacouture, St. Leonard, MD (US); Amber DeMarr, St. Leonard, MD (US)

(73) Assignee: Morgan State University, Baltimore, MD (US)

( * ) Notice: Subject to any disclaimer, the term of this patent is extended or adjusted under 35 U.S.C. 154(b) by 0 days.

(21) Appl. No.: 17/487,159

(22) Filed: Sep. 28, 2021

(65) Prior Publication Data

US 2022/0095593 A1    Mar. 31, 2022

Related U.S. Application Data

(60) Provisional application No. 63/084,289, filed on Sep. 28, 2020.

(51) Int. Cl.
*A01K 61/54*    (2017.01)
(52) U.S. Cl.
CPC .................... *A01K 61/54* (2017.01)

(58) Field of Classification Search
CPC ............ A01K 61/00; A01K 61/54; E02B 3/04
See application file for complete search history.

(56) References Cited

U.S. PATENT DOCUMENTS

| | | | | |
|---|---|---|---|---|
| 5,720,573 A | * | 2/1998 | Benedict | E02B 3/04 405/21 |
| 6,142,704 A | * | 11/2000 | Coyne | E01F 7/00 405/114 |
| 2017/0233965 A1 | * | 8/2017 | Boasso | E02B 3/12 |

* cited by examiner

*Primary Examiner* — Joshua J Michener
*Assistant Examiner* — Henry Hooper Mudd
(74) *Attorney, Agent, or Firm* — Whiteford, Taylor & Preston, LLP; Gregory M. Stone

(57) ABSTRACT

A curtain enclosure formed from a flexible, non-permeable membrane is positioned adjacent to a section of riprap or similarly configured structure that has been installed along a shoreline. The curtain is stretched around rigid elongate posts and extends outward into the water from the edge of the riprap to create an enclosed containment area formed between the interior of the curtain and the edge of the riprap. The bottom of the curtain is weighted to sit along the bed of the water body and resist movement in that position. Once the curtain enclosure has been formed, larval bivalve organisms, such as oyster larvae, are poured into the curtain enclosure, and thereafter the curtain enclosure is maintained in that position for a period sufficient to promote attachment and growth of the larvae on the riprap.

9 Claims, 3 Drawing Sheets

SYSTEM AND METHOD FOR PROMOTING ATTACHMENT AND GROWTH OF BIVALVE ORGANISMS ON COASTAL STRUCTURES

CROSS REFERENCE TO RELATED APPLICATIONS

This application is based upon and claims the benefit of U.S. Provisional Application No. 63/084,289 titled "Method to Set Bivalves onto Riprap and Other Structures," filed with the United States Patent & Trademark Office on Sep. 28, 2020, the specification of which is incorporated herein by reference in its entirety.

FIELD OF THE INVENTION

This invention relates generally to systems and methods for fostering the establishment and growth of bivalve organisms, and more particularly to systems and methods for the establishment and growth of bivalve organisms along shorelines, and particularly along shorelines that have been hardened with riprap or other similar structures.

BACKGROUND OF THE INVENTION

Bivalve organisms, such as oysters, provide a wealth of ecosystem services to water environments. These organisms form habitats, sequester nutrients, filter sediments from water, and consume over-productive and problematic phytoplankton. However, due to a combination of disease and historical overharvesting, oyster populations have experienced significant decline in many regions. For example, the current oyster population in Maryland is less than 1% of its historical population.

Over the last decade, great progress has been made to document the value of oysters and to restore some small areas in specific tributaries. Certain additional ecosystem benefits have been realized through the growth of the aquaculture industry, along with efforts of shoreline residents that have added oyster floats to their docks. However, the scale of all of these prior efforts as a whole only begins to scratch the surface of the water quality problems that plague coastlines. While residents of those coastlines have clearly demonstrated a willingness and interest in helping to address those problems through their own installations of oyster floats, there remains significant opportunity to improve their impact if they can establish perennial oyster populations on their revetments that include riprap. Riprap is an extremely common material used in both traditional and more modern "living shoreline" efforts to reduce erosion and property loss along shorelines. Given the wide availability of such riprap structures, significant opportunity remains to enhance riprap structure with bivalves, and to leverage the associated ecosystem benefits that would result, if adequate systems and methods were provided for establishing and fostering the growth of bivalves on such riprap. For instance, natural wave action against the riprap may present challenges to the initial establishment and thus ultimate growth of bivalves on such riprap structures.

Thus, given the extensive use of riprap and its ready availability and accessibility, there remains a need in the art for systems and methods capable of aiding in the initial establishment of bivalve organisms and ultimately promoting the growth of such organisms on riprap structures and similar structures positioned along shorelines.

SUMMARY OF THE INVENTION

Disclosed herein are systems and methods for promoting the attachment and growth of bivalve organisms, such as oysters, on existing riprap along shorelines. In accordance with certain aspects of an embodiment of the invention, a curtain enclosure is formed from a flexible, non-permeable membrane adjacent to a section of riprap or similarly configured structure that has been installed along a shoreline. The curtain is stretched around rigid elongate posts and extends outward into the water from the edge of the riprap (by way of non-limiting example, three feet out into the water from the front of the riprap), to create an enclosed area formed between the interior of the curtain and the edge of the riprap. The bottom of the curtain is weighted so as to sit along the bed of the water body and resist movement in that position. Once the curtain enclosure has been formed, larval bivalve organisms, such as oyster larvae, are poured into the curtain enclosure, for example at a concentration of at least 16 larvae/cm$^2$ of the enclosed area, and thereafter the curtain enclosure is maintained in that position preferably for a period of at least 7 days to promote attachment and growth of the larvae on the riprap. Given the wide availability of riprap along shorelines, such a system and method for attachment and growth of bivalves may make use of hundreds of miles of hardened shorelines and greatly enhance current oyster restoration efforts.

In accordance with certain aspects of an embodiment of the invention, a system is provided for promoting attachment and growth of bivalve organisms on coastal structures, comprising a plurality of elongate rods, wherein at least two of the elongate rods are positioned against a wall formed of riprap on a shoreline, and at least one of the elongate rods is positioned in water from the wall, a non-permeable, flexible, planar panel engaging each elongate rod and forming an enclosure defined by an interior of the panel and a water-facing edge of the riprap, the enclosure having an enclosed area, and larval bivalve organisms provided in concentration of at least 16 larvae/cm$^2$ of said enclosed area.

In accordance with further aspects of an embodiment of the invention, a method is provided for promoting attachment and growth of bivalve organisms on coastal structures, comprising providing a plurality of elongate rods, positioning at least two of the elongate rods against a wall formed of riprap on a shore line, and positioning at least one of the elongate rods in water away from the wall, providing a non-permeable, flexible, planar panel engaging each elongate rod to form an enclosure defined by an interior of the panel and a water-facing edge of the riprap, the enclosure having an enclosed area, providing larval bivalve organisms provided in concentration of at least 16 larvae/cm$^2$ of the enclosed area, and pouring the larval bivalve organisms into the enclosure.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
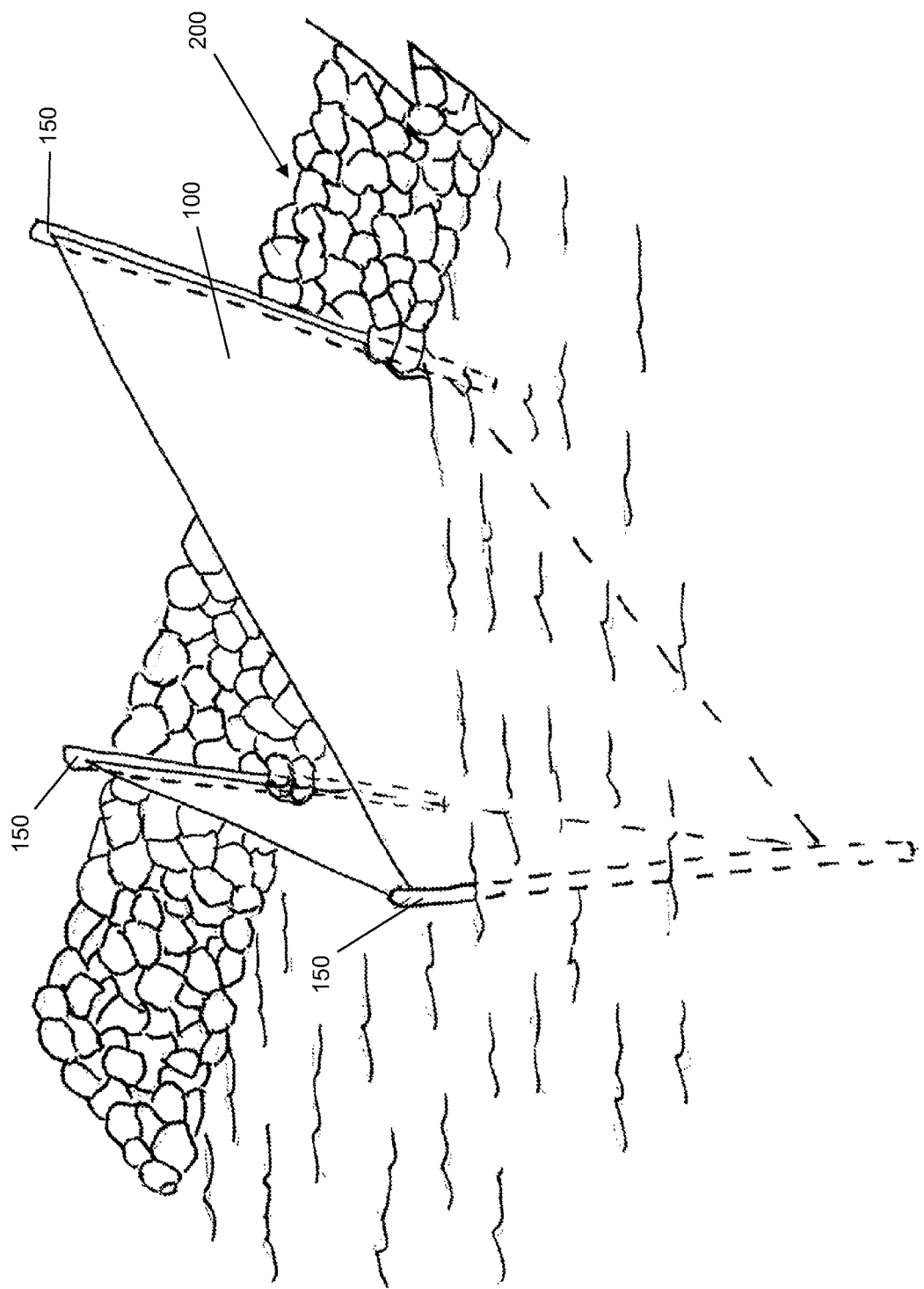
FIG. 1 is a view of a system taken several feet from the shoreline for promoting attachment and growth of bivalve organisms on coastal structures in accordance with certain aspects of an embodiment of the invention.
Figure 2:
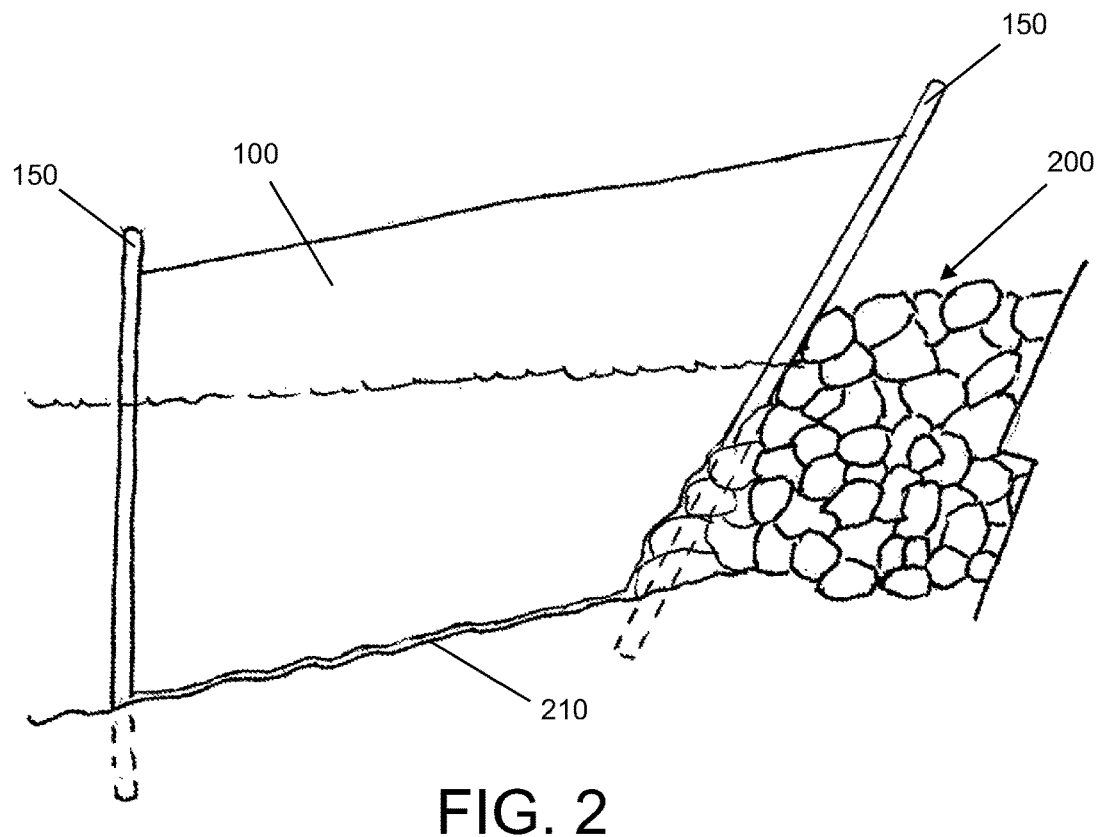
FIG. 2 is a side view of the system of FIG. 1 showing portions of the system both above and below the water line.
Figure 3:
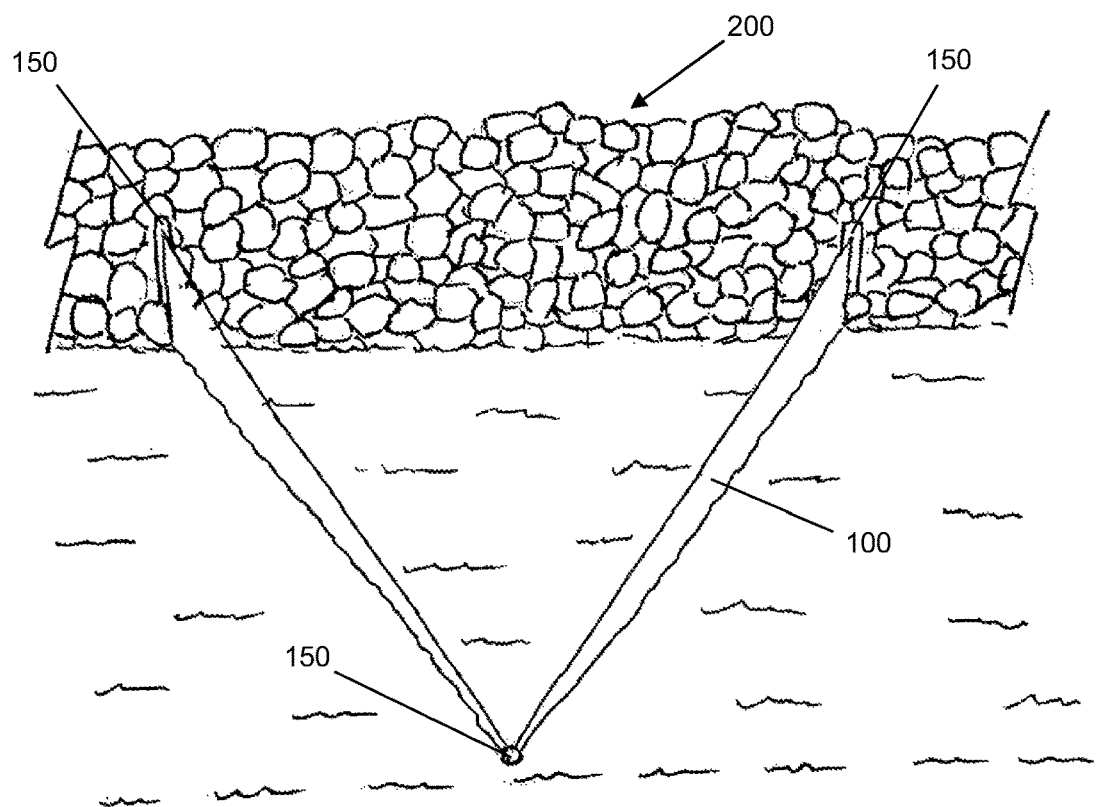
FIG. 3 is a top view of the system of FIG. 1.

In accordance with certain aspects of an exemplary embodiment, and with reference to FIGS. 1-3, by way of summary a system for promoting attachment and growth of bivalve organisms includes a flexible curtain 100 attached to a series of rigid, elongate posts 150 that may be positioned in and extend upward from a section of riprap 200 that has been installed along a shoreline, along with one or more additional rigid, elongate posts 150 positioned in the water a distance out and away from the water-facing edge of riprap 200. Curtain 100 is sufficiently flexible so that it may be wrapped around or otherwise attached to posts 150 to form a fenced area defined by the position of posts 150. Thus, the overall shape and configuration of the resulting fenced area may be adapted to the particular geography at which it is to be installed. As will be discussed in greater detail below, the bottom of curtain 100 is weighted so as to remain generally stationary on the bed 210 of the water body adjacent the section of riprap 200 after curtain 100 and rigid posts 150 have been installed. After such installation, the now enclosed area between the curtain 100 and the riprap 200 is treated with larval bivalve organisms, such as oyster larvae. The area then remains enclosed for a period sufficient to allow the oyster larvae to attach to the rocky surfaces of the riprap (such as a period of at least seven days), after which they will continue to mature into oysters while being significantly protected from wave energy and other disturbances that might otherwise tend to interfere with their maturation cycle.

Figure 4:
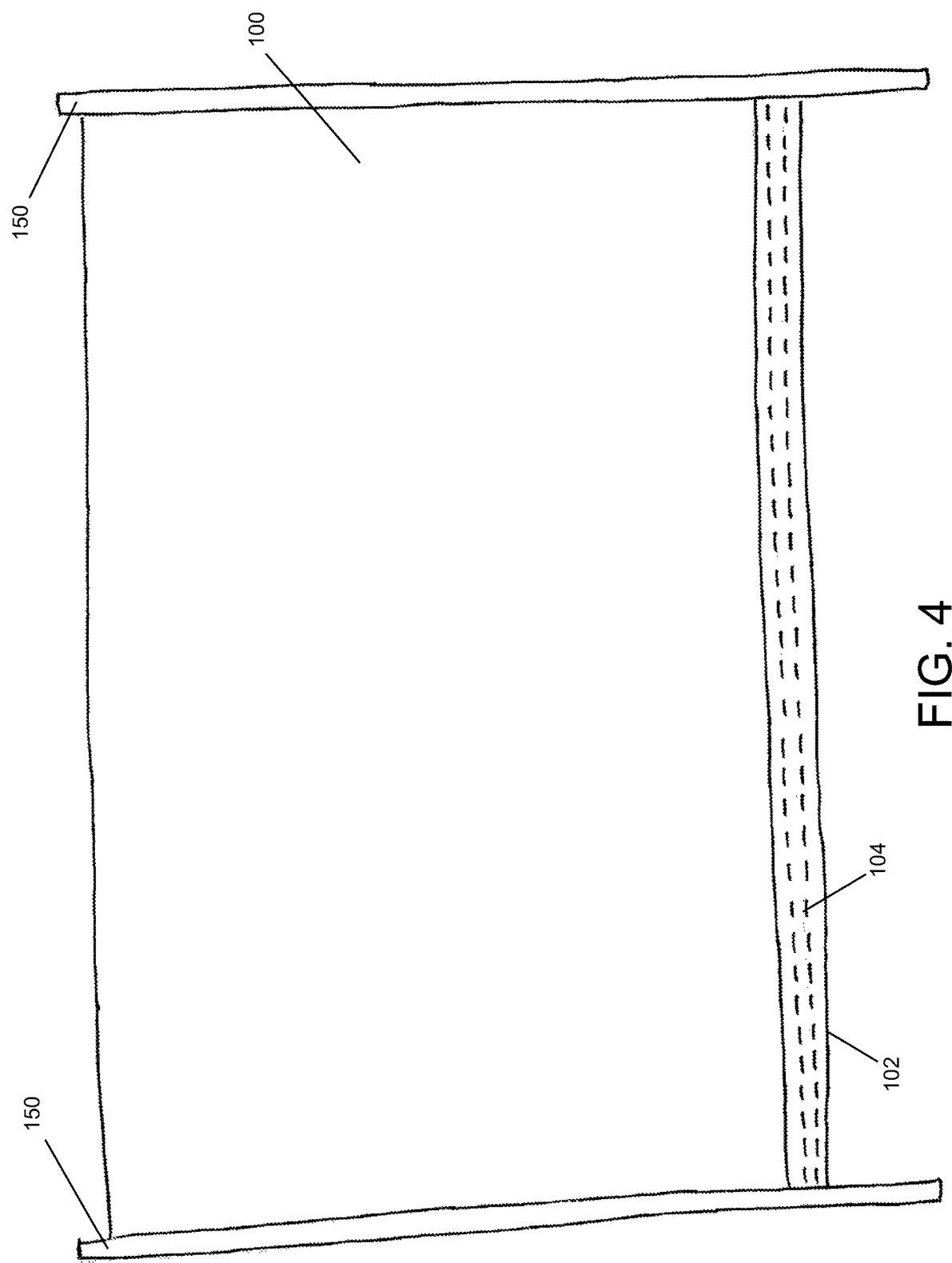
FIG. 4 is a close-up side view of a section of the system of FIG. 1 according to further aspects of an embodiment of the invention.

With continued reference to FIGS. 1-3 and the detail side view of FIG. 4, curtain 100 includes a flexible sheet of natural or synthetic, preferably non-permeable material capable of being easily transported to a shoreline that has had riprap or other similar shore-protecting or other structures installed. In certain exemplary configurations, curtain 100 may be formed of, by way of non-limiting example, non-permeable silt barrier landscape cloth that is readily commercially available from a wide variety of commercial sources. In an exemplary prototype configuration, a curtain having a height dimension of at least 7 feet was found to be suitable to provide a sufficient containment area. Those skilled in the art will recognize that the width dimension of such curtain 100 will be determined by the particular geography of the shoreline on which the system described herein is to be employed. While the exemplary configuration shown in FIGS. 1-3 is particularly in the shape of a triangle, the containment area may take a variety of shapes to accommodate the particular features and geography of any section of riprap.

As noted above, curtain 100 is sufficiently flexible that it will conform to the outline that is established by rigid, elongate posts 150. Curtain 100 may be attached to rigid posts 150 using any of a wide variety of attachment mechanisms as will occur to those of ordinary skill in the art. For example, for ease of installation by an owner of a property along a shoreline on which riprap has been installed, curtain 100 may simply be clamped at upper and lower ends of curtain 100 to each elongate post 150 using, for example, a readily commercially available spring clamp. In other configurations, curtain 100 may include attachment mechanisms, such as straps attached to an interior of curtain 100 that may wrap around each post 150 at multiple vertical locations on each post 150, may receive ties extending through and wrapping around each post 150, or may even be provided with vertical sleeves permanently affixed to the interior side of curtain 100 and each configured to receive a single elongate post 150 therein. Those skilled in the art will recognize that any such attachment mechanism, and others as may readily occur, may be used to connect curtain 100 to posts 150 without departing from the spirit and scope of the invention, so long as such attachment mechanisms sufficiently hold curtain 100 in place to define the containment area adjacent the riprap 200 along the shoreline.

Rigid, elongate posts 150 may be formed of any rigid material as may be selected by those of ordinary skill in the art and that are both capable of being driven into and positioned on riprap 200 and bed 210 of the water body adjacent the section of riprap 200, and capable of holding curtain 100 in place even against wind and wave forces. In an exemplary prototype implementation, rigid, elongate posts 150 were each comprised of steel bars, with each post 150 having a length of at least 10 feet, which configuration was found to serve as a suitable anchor for curtain 100, although those of ordinary skill in the art will readily recognize that rigid, elongate posts 150 may likewise be formed of a wide variety of other materials, as long as they have sufficient strength and stiffness to hold curtain 100 for the duration of its installation adjacent riprap 200.

As mentioned above, curtain 100 is weighted along the bottom edge of the curtain so that it sits and remains on the bed 210 of the water body and as closely as possible against rocks of riprap 200 at its forward end, and thus minimizes leakage of oyster larvae from the defined containment area. To provide such a weighted bottom edge, and with particular reference to FIG. 4, a horizontal sleeve 102 is provided along the bottom edge of curtain 100 and extends throughout its entire length. A weighted cable, such as a weighted stainless steel cable 104, a heavy chain, or similarly configured elongate weight member, extends through sleeve 102 of curtain 100 throughout the length of curtain 100 so as to weight the bottom edge of curtain 100. Optionally, weights may also be provided and attached to cable 104 to further aid in weighting down the bottom edge of curtain 100 against the bed 210 of the water body. For example, weights may be provided, such as by way of non-limiting example three-pound weights, having openings that may receive cable 104 so that cable 104 is threaded through the weights 106, with the weights inside of sleeve 102 positioned at, for example, approximately every three feet of cable 104.

In this configuration, curtain 100 may form a containment area adjacent riprap 200 along the shoreline for reception and capture of oyster larvae as further detailed below, along with protection of the oyster larvae (and the resulting maturing oysters) as they initially attach to and begin to grow on the riprap surfaces in such containment area. Those skilled in the art will recognize that curtain 100 should be manually positioned at the front, bottom edges of curtain 100 that engage riprap 200 to ensure that the containment area is as sealed as possible to minimize the risk of leakage of larvae.

The foregoing system (including curtain 100, elongate posts 150, weighted cable 104, and optionally weights) may preferably be provided for sale in kit form for purchase and installation by a homeowner of a property having a shoreline on which riprap has been installed.

In a prototype implementation of the foregoing system, multiple sites were selected along a stretch of riprap in St. Leonard Creek, Md., with each such site receiving a control rock placed in open water and a treatment rock placed within the containment area formed by curtain 100, with each of the control rock and the treatment rock positioned at least 7 m apart. Prior to their placement, each of the control rocks and the treatment rocks were initially prepared for each site in a laboratory environment by attaching hooks to enable anchoring of the control rocks and treatment rocks in the riprap, marking off two 10×10 cm quadrats, and exposing the rocks to seawater to allow for growth of biofilm ("seasoning") in a tank with circulating bay water for several days. Such seasoning improves oyster larval attachment.

A containment area was then formed with a curtain 100 configured as described above around each treatment rock using the system described above. Curtains 100 were stretched in a triangular shape from the top to the bottom of the riprap with weighted cable 104 in the form of a chain extending along the bottom edge of each curtain 100 to minimize leakage of larvae and maximize larval attachment on the riprap (and particularly the treatment rock). Once the containment area was formed, 360,000 oyster larvae ready for attachment were then poured into each curtain enclosure.

The curtains were removed after 7 days and the control and treatment rocks were monitored over time to evaluate oyster survival and growth. Counts of oysters set in quadrats were extrapolated to estimate the total number of oysters set within the average curtain 100. The estimate was then extrapolated to estimate oyster set if the entire revetment were enclosed.

28 days after larval release, the experimental trial rocks were examined for young oysters. Three of the four treatment rocks had oysters growing in the quadrats, while no oysters grew on the control rocks. The lack of growth of oysters on one of the four treatment rocks is believed to be the result of extraordinarily low water salinity (with salinities during the test period being some of the lowest levels on record for over a decade), which may have reduced larval attachment and survival.

Nonetheless, because growth only occurred on treatment rocks, in spite of stressful environmental conditions (i.e., the selected test location had a salinity average of 7.0 ppt during the test period), these results confirmed that the foregoing system and method has significant potential for success in even low salinity water environments, and anticipated even greater success in higher salinity environments.

In the foregoing prototype implementation, each curtain enclosure defined a bottom triangular surface area of at least 22,030 $cm^2$ (with the actual surface area certainly being higher given the three-dimensional contours of the bed 210 and the riprap 200, as opposed to a hypothetical planar, flat surface), which defined a minimal estimate of the area to which oysters could attach. Total oyster set for an entire curtain enclosure area averaged 642 oysters, with the enclosure having the most exposed area having a total estimated count of 1,300 oysters. If the entire riprap revetment were enclosed at the selected site, and a similar density of oyster larvae were added under similar (low salinity) environmental conditions, it is estimated that 33,856 oysters would have grown successfully. This is a minimal estimate as there is likely much greater riprap surface area than is represented with this simplistic, planar model.

Thus, based on the foregoing, a minimal concentration of 16 oyster larvae/$cm^2$ of minimal enclosed surface area inside of a curtain enclosure formed as above adjacent a section of riprap along a shoreline, and maintained for a period of at least seven days, should yield significantly improved attachment and enhanced growth of oysters.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A method for promoting attachment and growth of bivalve organisms on coastal structures, comprising:
   providing a plurality of elongate rods;
   positioning at least two of said elongate rods against a wall formed of riprap on a shoreline, and positioning at least one of said elongate rods in water away from said wall;
   providing a non-permeable, flexible, planar panel engaging each elongate rod to form an enclosure defined by an interior of said panel and a water-facing edge of the riprap, said enclosure having an enclosed area;

providing larval bivalve organisms provided in concentration of at least 16 larvae/cm$^2$ of said enclosed area; and pouring said larval bivalve organisms into said enclosure.

2. The method of claim 1, further comprising the steps of:

maintaining a position of said panel for at least seven days; and removing said panel and said elongate rods from said site.

3. The method of claim 1, further comprising the step of affixing said panel to each elongate rod.

4. The method of claim 1, wherein said panel has a weighted bottom edge.

5. The method of claim 4, wherein said weighted bottom edge extends along a full length of said panel.

6. The method of claim 4, wherein said weighted bottom edge further comprises a weighted cable extending through a sleeve positioned along a bottom edge of the panel.

7. The method of claim 6, further comprising the step of affixing said weighted cable to each said elongate rod positioned against the wall formed of riprap.

8. The method of claim 6, further comprising the step of engaging a plurality of weights on said weighted cable.

9. The method of claim 1, wherein said bivalve organisms further comprise oysters.

* * * * *